United States Patent
Ros Sanchez et al.

(10) Patent No.: US 10,824,909 B2
(45) Date of Patent: Nov. 3, 2020

(54) SYSTEMS AND METHODS FOR CONDITIONAL IMAGE TRANSLATION

(71) Applicant: Toyota Research Institute, Inc., Los Altos, CA (US)

(72) Inventors: German Ros Sanchez, San Francisco, CA (US); Adrien D. Gaidon, Mountain View, CA (US); Kuan-Hui Lee, Redwood City, CA (US); Jie Li, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 329 days.

(21) Appl. No.: 15/979,911

(22) Filed: May 15, 2018

(65) Prior Publication Data

US 2019/0354804 A1 Nov. 21, 2019

(51) Int. Cl.
*G06K 9/62* (2006.01)
*G06N 20/00* (2019.01)

(52) U.S. Cl.
CPC ......... *G06K 9/6257* (2013.01); *G06K 9/6267* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2005/0044053 A1* | 2/2005 | Moreno | ............... | G06K 9/6226 706/20 |
| 2008/0013821 A1* | 1/2008 | Macgregor | ........... | G06T 7/0006 382/141 |
| 2011/0010319 A1* | 1/2011 | Harada | ............... | G06F 16/3347 706/12 |
| 2016/0292589 A1* | 10/2016 | Taylor, Jr. | ........... | G06F 16/1744 |
| 2017/0228659 A1 | 8/2017 | Lin et al. | | |
| 2017/0345140 A1 | 11/2017 | Zhang et al. | | |

(Continued)

OTHER PUBLICATIONS

Peng et al., "Synthetic to Real Adaptation with Generative Correlation Alignment Networks," arXiv:1701.05524v3 [cs.CV] Mar. 18, 2017.

(Continued)

*Primary Examiner* — Kevin Ky
(74) *Attorney, Agent, or Firm* — Christopher G. Darrow; Darrow Mustafa PC (57) ABSTRACT

System, methods, and other embodiments described herein relate to conditionally generating custom images by sampling latent space of a generator. In one embodiment, a method includes, in response to receiving a request to generate a custom image, generating a component instruction by translating a description about requested characteristics for the object instance into a vector that identifies a portion of a latent space within a respective generator. The method includes computing the object instance by controlling the respective one of the generators according to the component instruction to produce the object instance. The respective one of the generators being configured to generate objects within a semantic object class. The method includes generating the custom image from at least the object instance to produce the custom image from the description as a photorealistic image approximating a real image corresponding to the description.

20 Claims, 6 Drawing Sheets

(56) References Cited

U.S. PATENT DOCUMENTS

| | | | |
|---|---|---|---|
| 2017/0351952 A1 | 12/2017 | Zhang et al. | |
| 2018/0046854 A1* | 2/2018 | Kittler | G06K 9/00248 |
| 2018/0052876 A1* | 2/2018 | Liu | G06F 16/313 |
| 2018/0107682 A1* | 4/2018 | Wang | G06N 3/08 |
| 2018/0107684 A1* | 4/2018 | Kiapour | G06F 16/583 |
| 2018/0107902 A1* | 4/2018 | Yang | G06N 3/0445 |
| 2018/0157681 A1* | 6/2018 | Yang | H03M 13/1575 |
| 2018/0247201 A1* | 8/2018 | Liu | G06N 3/0454 |
| 2018/0285682 A1* | 10/2018 | Najibi | G06K 9/4671 |
| 2018/0314917 A1* | 11/2018 | Mehr | G06T 7/30 |
| 2019/0087965 A1* | 3/2019 | Datta | G06T 7/251 |
| 2019/0130279 A1* | 5/2019 | Beggel | G06K 9/6269 |
| 2019/0163766 A1* | 5/2019 | Gulati | G06F 16/532 |
| 2019/0295302 A1* | 9/2019 | Fu | G06N 3/0454 |
| 2019/0318648 A1* | 10/2019 | Zhang | G06N 3/08 |

OTHER PUBLICATIONS

Jing et al., "Neural Style Transfer: A Review," arXiv:1705.04058v1 [cs.CV] May 11, 2017.

Luan et al, "Deep Photo Style Transfer," arXiv:1703.07511v3 [cs.CV] Apr. 11, 2017.

Zhu et al., "Unpaired Image-to-Image Translation using Cycle-Consistent Adversarial Networks," arXiv:1703.10593v4 [cs.CV] Feb. 19, 2018.

A. Gaidon et al., "Virtual Worlds as Proxy for Multi-Object Tracking Analysis," arXiv:1605.06457v1 [cs.CV] May 20, 2016.

J. Goodfellow, et al."Generative adversarial networks", arXiv:1406.2661v1 [stat.ML] Jun. 10, 2014.

A. Shrivastava, et al., "Learning from Simulated and Unsupervised Images through Adversarial Training", arXiv:1612.07828v2 [cs.CV] Jul. 19, 2017.

Isola et al., "Image-to-Image Translation with Conditional Adversarial Networks", arXiv:1611.07004v2 [cs.CV] Nov. 22, 2017.

Genevay, et al., "GAN and VAE from an Optimal Point of View," Http://arXIV:1706.01807v1, Jun. 2017.

Yu, et al., "Deep Learning for Topology Optimization Design," https://arxiv.org/pdf/1801.05463 Jan. 2018.

Wang, et al., Text Generation Based on Generative Adversarial Nets with Latent Variable, arXiv:1712.00170v1 [cs.CL] Dec. 1, 2017.

Rosca, et al., Variational Approaches for Auto-Encoding Generative Adversarial Networks arXiv:1706.04987v2 [stat.ML] Oct. 21, 2017.

Zhang, et al., StackGAN++: Realistic Image Synthesis with Stacked Generative Adversarial Networks IowarXiv: 1710.10916v2 [cs.CV] Dec. 25, 2017.

Pu et al., Adversarial Symmetric Variational Autoencoder, http://arXiv:1711.04915v2 Nov. 2017.

Li et al., Video Generation From Text, http://arXiv:1710.00421v1 Oct. 2017.

* cited by examiner

SYSTEMS AND METHODS FOR CONDITIONAL IMAGE TRANSLATION

TECHNICAL FIELD

The subject matter described herein relates, in general, to systems and methods for generating photorealistic custom images according to selected options, and, in particular, to generating the custom images by selectively sampling a latent space of a variational autoencoder to control how characteristics of the custom images are generated.

BACKGROUND

Machine perception and understanding of electronic information can represent a difficult task. For example, machines (e.g., robots) generally use electronic sensors such as cameras, LiDAR, and other sensors to acquire information about a surrounding environment. The information can take different forms such as still images, video, point clouds, and so on. However, understanding the contents of the information can be a complex task. In one approach, a machine learning algorithm may be employed to perform a particular perception task such as detecting objects within provided image data. While machine learning algorithms can be effective at such tasks, the accuracy of such approaches generally depends on the quantity, diversity, and quality of training examples that the machine learning algorithm uses to learn the task.

However, acquiring this breadth and quantity of training data can represent a significant hurdle to training the algorithm. For example, collecting actual sensor data for such a task generally involves driving a vehicle over many miles and through many different environments to collect raw data, which then is manually labeled to provide annotations in the data that can be used by the algorithm for training. As such, manually collecting and labeling sensor data is generally inefficient and often includes inaccuracies from errors associated with the manual labeling process. Moreover, in further approaches, a machine learning algorithm learns a perception task using simulated data such as data comprised of synthetic images. When, for example, a simulator produces a synthetic image, objects, and configurations of the objects within the synthetic image are generally known or are at least easily labeled through automated processes because of the nature of the image. However, controlling the exact representation within such images can be limited and thus producing a desired variety may encounter difficulties.

Furthermore, additional difficulties can be encountered through a lack of photorealism associated with the synthetic images. As a result of this discrepancy in realism, the synthetic images can introduce a gap within the understanding of the machine learning model when used as a training source. Accordingly, difficulties with accurately training machine learning models persist.

SUMMARY

In one embodiment, example systems and methods relate to a manner of controlling how a plurality of purpose-built generative models create photorealistic computer-generated images. Thus, the disclosed approach provides an interface mechanism into a rendering engine that permits at least partial control over how generators within the rendering engine create components of the custom image. Accordingly, the interface mechanism permits the creation of data sets including the custom images that conform to desired statistical distributions of different object instances and characteristics for the object instances while also ensuring the custom images are provided in a photorealistic form. In this way, the disclosed system provides improved data sets of the photorealistic images such that training of task-specific models is also improved according to the advantages realized in the custom images.

For example, in one embodiment, an adaptation system implements a generative module that includes a plurality of generators to generate different object instances that are to be included within a custom image. The generators are, in one embodiment, variational autoencoders or some variation thereof such that the generators include a latent space, which represents a variety of object instances for an associated semantic object class (e.g., vehicles, roads, etc.). Accordingly, the latent space is an encoding produced by the separate generators when trained on one of the semantic object classes.

As such, the adaptation system samples encodings from the latent space of the various generators and controls the generators to produce computer-generated object instances therefrom. By performing this task iteratively over at least a substantial portion of each respective latent space, the adaptation system builds a library of templates that identify different characteristics of object instances that may be generated. Accordingly, the adaptation system can accept requests that include descriptions of a scene depicted in a custom image and generate the custom image from the description through the use of the noted templates. That is, the description can include the templates and a general selection of relative locations for object instances identified by the templates. The adaptation system, in one embodiment, generates component instructions for generating the object instances from the description by mapping the templates to vectors that correspond with the characteristics in the latent space of an associated generator.

Thereafter, the adaptation system can control execution of the respective generators using the component instructions to produce the separate object instances. The object instances are then, for example, blended together into the custom image to provide a depiction of the selected object instances in a photorealistic image. In this way, the adaptation system improves the process for generating the custom images by providing for direct control of how the object instances within the custom images are generated while also providing the object instances in a photorealistic form through the use of the generative module.

In one embodiment, an adaptation system for generating a custom image using a generative module that includes a plurality of generators is disclosed. The adaptation system includes one or more processors and a memory communicably coupled to the one or more processors. The memory stores an input module including instructions that when executed by the one or more processors cause the one or more processors, in response to receiving a request to generate the custom image, the request including a description of at least an object instance that is to be included within the custom image, generate a component instruction by translating the description about requested characteristics for the object instance into a vector that identifies a portion of a latent space within a respective one of the generators that correlates with the requested characteristics. The memory storing a translation module including instructions that when executed by the one or more processors cause the one or more processors to compute the object instance of the custom image by controlling the respective one of the generators according to the component instruction to produce the object instance. The respective one of the generators being configured to generate objects within a semantic object class associated with the object instance. The translation module includes instructions to generate the custom image from at least the object instance to produce the custom image from the description as a photorealistic image approximating a real image corresponding to the description.

In one embodiment, a non-transitory computer-readable medium for generating a custom image using a generative module that includes a plurality of generators and including instructions that when executed by one or more processors cause the one or more processors to perform one or more functions. The instructions include instructions to, in response to receiving a request to generate the custom image, generate a component instruction by translating the description about requested characteristics for an object instance into a vector that identifies a portion of a latent space that correlates with the requested characteristics. The latent space being within a respective one of the generators. The instructions include instructions to compute the object instance of the custom image by controlling the respective one of the generators according to the component instruction to produce the object instance. The respective one of the generators being configured to generate objects within a semantic object class of the object instance. The instructions including instructions to generate the custom image from at least the object instance to produce the custom image from the description as a photorealistic image approximating a real image corresponding to the description.

In one embodiment, a method for generating a custom image using a generative module that includes a plurality of generators disclosed. In one embodiment, a method includes, in response to receiving a request to generate the custom image, generating a component instruction by translating the description about requested characteristics for an object instance into a vector that identifies a portion of a latent space that correlates with the requested characteristics, the latent space being within a respective one of the generators. The method includes computing the object instance of the custom image by controlling the respective one of the generators according to the component instruction to produce the object instance. The respective one of the generators being configured to generate objects within a semantic object class of the object instance. The method includes generating the custom image from at least the object instance to produce the custom image from the description as a photorealistic image approximating a real image corresponding to the description.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with creating photorealistic computer-generated images by controlling a plurality of purpose-built generative models are disclosed. As mentioned previously, quantity, quality and diversity of training data generally controls how well a machine learning model is trained and by extension how well the model performs. For example, if the training data is lacking in quality due to a lack of photorealism, then a model may suffer from gaps in understanding that are realized as inaccurate determinations by the model. Similarly, if the training data is lacking in diversity (e.g., diversity in different types of objects and characteristics of the objects), then the model may also experience gaps in understanding. In either case, shortcomings within training data carry over into the understanding of the machine learning models such that the models generally do not perform to the same standards as when trained with, for example, training data that conforms to the noted characteristics.

Therefore, in one embodiment, an adaptation system provides for generating custom images that are photorealistic and with a requested distribution and form of selected objects such that the models are improved when trained using the generated images. For example, in one embodiment, an adaptation system implements a generative module to create the custom images. The generative module may take different forms depending on a particular implementation but generally includes an arrangement of machine learning models (i.e., generators) such that, for example, separate ones of the models or combinations of the models translate descriptions about object instances into photorealistic representations that are then combined to form a custom image.

In one embodiment, the generators are arranged in a stack, while in further embodiments, the generators are arranged into a hierarchy. In either case, the generators can, either separately or in combination through successive layers, create the different object instances according to a provided description. The generators themselves are, in one embodiment, variational autoencoders formed from generative adversarial networks (GANs) or some variation thereof such that the generators include a latent space, which represents a variety of object instances for an associated semantic object class (e.g., vehicles, roads, etc.). The latent space represents an encoding of different object instances within a semantic object class, which the generator is initially trained to create. Accordingly, the latent space includes encodings that represent different configurations of the same object class and thus includes representations for different features, colors, textures, shapes, and so on in relation to characteristics of the object class.

The adaptation system can reference into the latent space for a respective generator using vector quantities to identify particular areas associated with the different characteristics. As such, the adaptation system, in one embodiment, initially analyzes the latent space for the separate generators by sampling encodings therein and controlling the generators to produce computer-generated object instances such that the corresponding characteristics induced in the generated object instance can be identified. By performing this analysis of the latent spaces associated with the separate generators, the adaptation system builds a template library that maps different characteristics of an object class to different vector quantities linked to the latent space.

The adaptation system leverages this information in order to permit selectively generating object instances with different characteristics as can be indicated through electronic requests. Thus, in one embodiment, the adaptation system accepts the electronic requests, which include a description of a scene that is to be depicted in a custom image and generates the custom image from the description through the use of the noted templates. The description, in one embodiment, includes the templates, or at least a reference thereto, and a selection of relative locations for object instances identified by the templates.

The adaptation system, in one embodiment, then generates component instructions for creating the separate object instances from the description by mapping the templates to vectors that correspond with the identified characteristics in the latent space of an associated generator. Subsequently, the adaptation system, in one embodiment, controls execution of the respective generators using the associated component instructions to produce the separate object instances. The object instances are then, for example, blended together to form the custom image that is a photorealistic depiction of the requested scene. In this way, the adaptation system improves the process for generating the custom images by providing for control of how the object instances within the custom images are generated while also providing the object instances in a photorealistic form through the use of the generative module.

Thereafter, the adaptation system can provide the custom image and corresponding labels for training further models on specific tasks. It should be noted that the labels are, for example, intrinsically identified within the custom image through the original description. Thus, the object instances within the custom image are pre-labeled in addition to being custom generated. Accordingly, the adaptation system improves the generation of labeled training data such that realistic depictions of various scenes including labels of objects in the scenes can be efficiently generated in lieu of using manual processes or synthetic images that lack photorealism.

Figure 1:
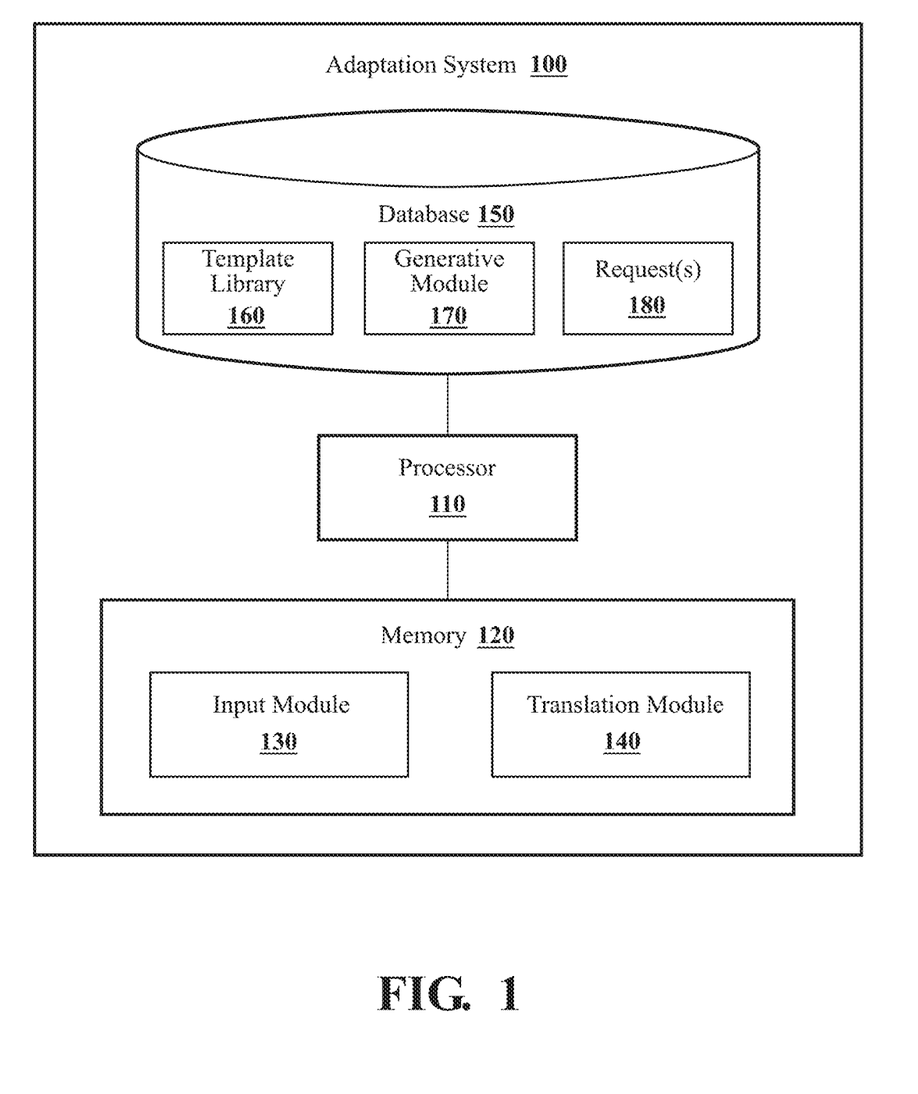
FIG. 1 illustrates one embodiment of an adaptation system that is associated with conditionally generating custom images by sampling latent space of a generator.

Referring to FIG. 1, one embodiment of an adaptation system 100 that is implemented to perform methods and other functions as disclosed herein relating to generating photorealistic images by controlling a generative module through sampling of latent spaces therein is illustrated. As an initial matter, it should be appreciated, that while the adaptation system 100 is illustrated as being a single contained system, in various embodiments, the adaptation system 100 is a distributed system that is comprised of components that can be provided as a centralized server, a cloud-based service, and so on.

As an additional note, while the adaptation system 100 is generally applicable to many different contexts within which machine learning algorithms may be implemented, in one or more embodiments, the adaptation system 100 is implemented to at least support functions of an advanced driving assistance system (ADAS) and/or an autonomous driving module that provides autonomous driving (i.e., self-driving) functionality to a vehicle. For example, the autonomous driving module, in one embodiment, is comprised of a plurality of sub-modules that each perform a respective task in relation to autonomously operating the vehicle. The sub-modules may, in combination or individually, determine travel path(s), current autonomous driving maneuvers for the vehicle, future autonomous driving maneuvers and/or modifications to current autonomous driving maneuvers. Thus, to effectively operate the individual task-specific modules are initially trained using training data from different scenarios that the vehicle may encounter.

However, as previously noted, acquiring this training data, especially when targeted to a particular task module, can represent a significant difficulty. Therefore, the adaptation system 100 can be employed to generate training data for training various sub-modules by selectively generating custom images according to specified requests with task-specific subject matter. Accordingly, the adaptation system 100, in one embodiment, provides training data (e.g., labeled photorealistic images) to one or more of the sub-modules or components thereof for more efficiently training the sub-modules on associated tasks.

With further reference to FIG. 1, the adaptation system 100 is shown as including a processor 110. Accordingly, the processor 110 may represent a distributed processing resource, an individual local processor (e.g., a CPU, GPU, or application specific processor), or the adaptation system 100 may access the processor 110 through a data bus or another communication path. In one embodiment, the adaptation system 100 includes a memory 120 that stores an input module 130 and a translation module 140. The memory 120 is a random-access memory (RAM), read-only memory (ROM), a hard-disk drive, a flash memory, a processor cache, or other suitable memory for storing the modules 130 and 140. The modules 130 and 140 are, for example, computer-readable instructions that when executed by the processor 110 cause the processor 110 to perform the various functions disclosed herein.

Moreover, as previously noted, in various embodiments, one or more aspects of the adaptation system 100 are implemented as cloud-based services, and so on. Thus, one or more components of the adaptation system 100 may be located remotely from other components and may be implemented in a distributed manner. As an additional matter, the adaptation system 100 includes the database 150 as a means of storing various data elements. The database 150 is, in one embodiment, an electronic data structure stored in the memory 120 or a separate electronic data store and that is configured with routines that can be executed by the processor 110 for analyzing stored data, providing stored data, organizing stored data, and so on. Thus, in one embodiment, the database 150 stores data used by the modules 130 and 140 in executing various functions. In the embodiment depicted in FIG. 1, the database 150 includes a template library 160, a generative module 170, and/or other information such as requests 180 as may be used by the modules 130 and/or 140.

With further reference to the input module 130, in one embodiment, the input module 130 generally includes instructions that function to control the processor 110 to generate the template library 160 and instructions to generate component instructions as will be subsequently discussed in greater detail. In one approach, the input module 130 initially trains generators of the generative module 170 in relation to separate semantic object classes. That is, the generative module 170, in one embodiment, includes a plurality of generators that each correspond with a different semantic object class. The semantic object classes are classes or categories of different types of objects within which qualifying objects have the same or similar overall general characteristics but may vary in some features or aesthetic qualities. For example, semantic object classes may include vehicles, bicycles, people, dogs, cats, signs, buildings, and so on.

Thus, the input module 130 uses a set of training images (e.g., real images with labels) to initially train the respective generators on separate object classes. As a function of the training, the generators develop a latent space that is an encoded representation of the object instances of the associated object class represented within the set of training images. Accordingly, the latent space represents the distribution of different characteristics among the various objects of the semantic class in the set of training images.

Figure 2:
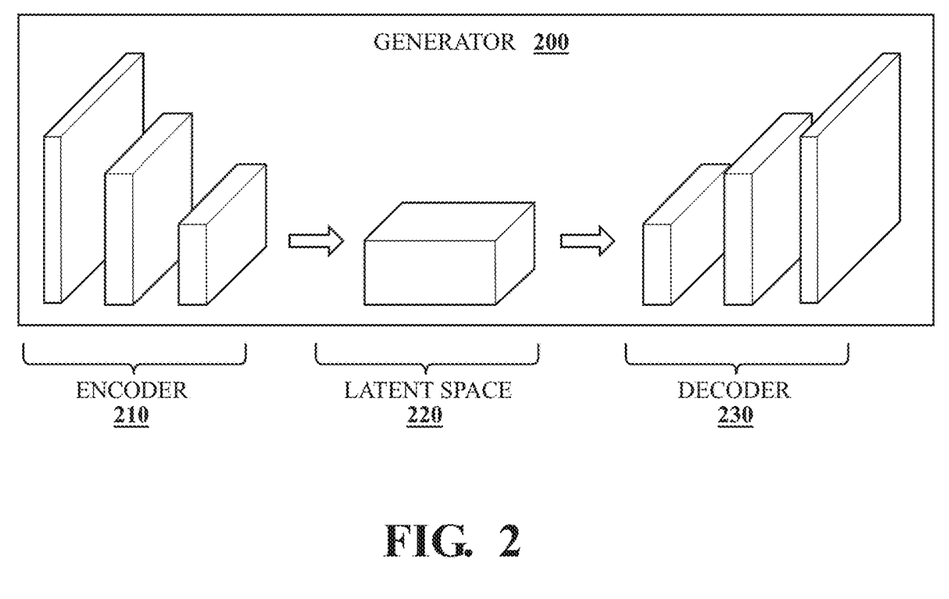
FIG. 2 illustrates one example of an architecture of a generator as embodied herein.

As further explanation of the structure of the generators, consider FIG. 2, which illustrates one embodiment of a generator 200. As illustrated in FIG. 2, the generator 200 is comprised of an encoder 210, a latent space 220, and a decoder 230. The encoder 210 and the decoder 230 are separate machine learning models or at least portions of machine learning models that function to encode an image provided as an input, and then decode the encoded representation to provide a custom photorealistic image that is distinct from the input. In either case, the generator 200 is a variational autoencoder. In further aspects, the generator 200 is a variational autoencoder generative adversarial network (VAE-GAN). Thus, the encoder 210 and the decoder 230 may be separate GANs, may be generative models that share a discriminator, or are another type of machine learning model.

In particular, the architecture of the encoder 210 and/or the decoder 230 within the individual generator 200 includes, in one embodiment, two stride-2 convolutions, several residual blocks, and two fractionally-strided convolutions with stride ½. In one embodiment, a discriminator of the generator 200 is a patch GAN that functions to classify overlapping image patches (i.e., sub-regions of 70×70 pixels). Of course, while a particular configuration is discussed for the encoder 210 and the decoder 230, in further embodiments, the particular configuration of the models may vary to include different configurations of layers and characteristics of the layers. In either case, the latent space 220 is generated through the training process for the generator 200. As such, the input module 130 samples encoded information within the latent space 220 in order to identify which portions control different characteristics of object instances generated by the generator.

That is, the input module 130 iteratively samples encodings within the latent space 220 to generate a mapping of the characteristics that is used to produce the template library 160. In one embodiment, the input module 130 randomly samples the encodings by generating vectors directed to the latent space 220. The input module feeds the encodings forward through the decoder 230 to cause the generator 200 to create an object instance according to the sampling. The input module 130 can then log identified characteristics of the object instance against the sampling in order to map the characteristics associated with different locations in the latent space 220. In a similar manner, the input module 130 performs similar steps to build the template library for additional generators associated with further semantic object classes.

Figure 3:
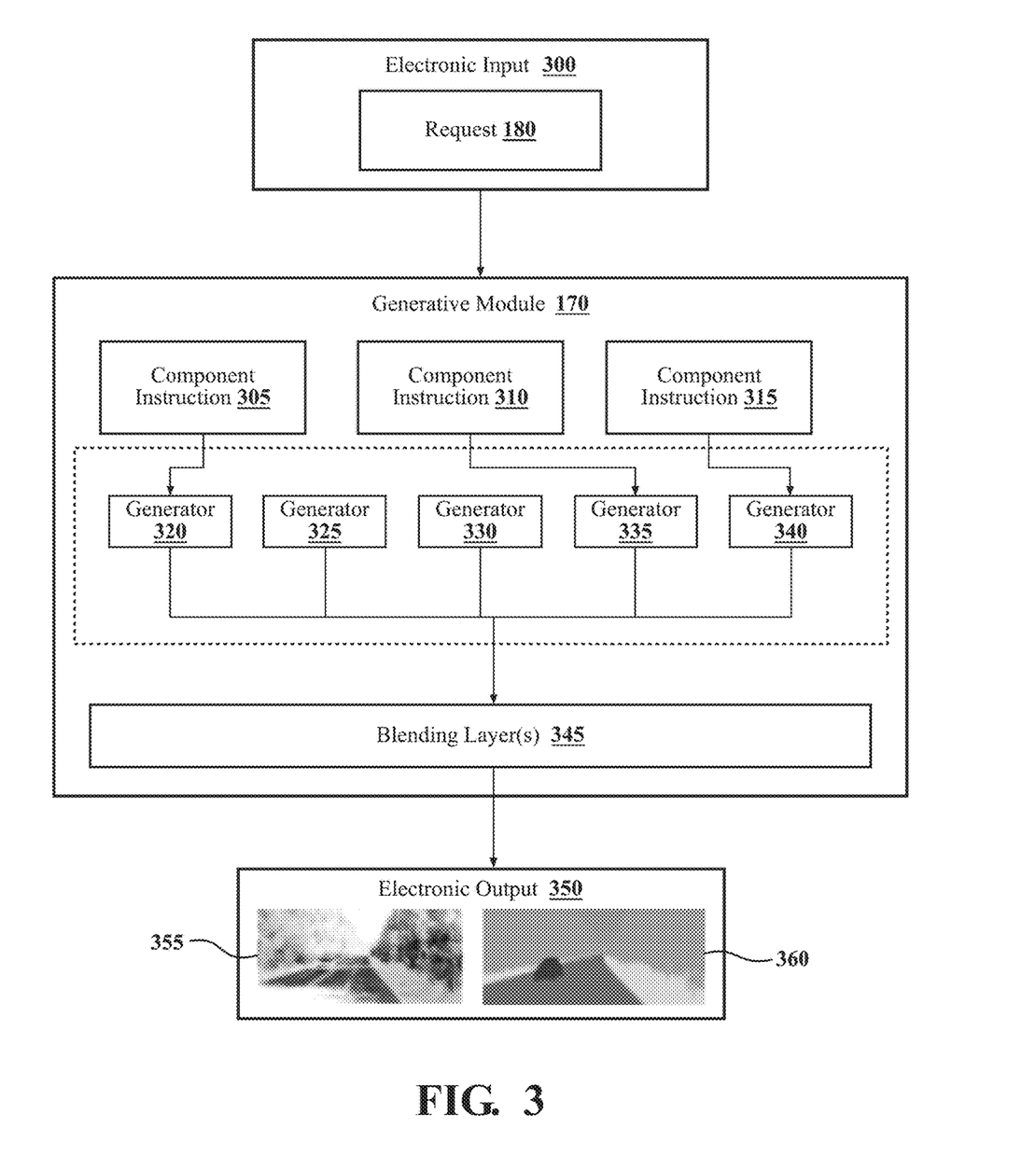
FIG. 3 illustrates an example of an architecture of a generative module including multiple generators.

As an additional explanation of the overall configuration of the generative module 170 and how the separate generators may be arranged therein, briefly consider FIG. 3, which illustrates one embodiment of the generative module 170. In FIG. 3, the generative module 170 is depicted as receiving an electronic input 300 that is based, at least in part, on the request 180. As will be discussed in greater detail subsequently, the input module 130 adapts a description within the request 180 into component instructions (e.g., 305, 310, and 315) that are passed to respective generators associated with corresponding object classes. Thus, as depicted in FIG. 3, the generative module 170 includes an arrangement of generators 320, 325, 330, 335, and 340 (hereinafter collectively referred to as 320-340) where the generators 320-340 are provided in a flat stack arrangement (also referred to as a forest) with each separate one of the generators 320-340 corresponding to a separate object class. In one embodiment, the generators 320-340 are provided in a one-to-one correspondence between classes of objects and generators. Of course, for purposes of illustration the arrangement is shown as including five separate generators; however, in various embodiments, the number of generators included in the generative module 170 generally corresponds to the number of object classes that may be translated.

Furthermore, while the generators 320-340 are shown in a flat arrangement, the separate generators may be implemented in different arrangements. That is, in one approach, the generators 320-340 are implemented in a hierarchy with successive layers refining outputs of previous layers until the generated object instances are photorealistic and are provided as electronic outputs of the hierarchy. Accordingly, the hierarchy, in one or more embodiments, is a tree of models, a plurality of stacks, a chain or another suitable implementation. Furthermore, the hierarchy of generators may be provided in an asymmetric configuration, a symmetric configuration, or as conforming to a particular type of data structure such as a standardized hierarchy (e.g., binary tree) or other relevant form. In general, the particular arrangement is not confined to such approaches and is instead intended to be flexible according to various considerations of different implementations (e.g., different models, different object classes, etc.).

When provided in a hierarchy configuration, generators within an initial layer may correspond in a one-to-one relationship with the object classes while subsequent successive generators in successive layer may be shared and implemented to refine results of previous layers. Accordingly, in such a configuration, the input module 130 generates the template library 160 according to, for example, generators of the initial layer.

Additionally, the particular implementation of the generators 320-340 may also vary according to, for example, a particular object class that correlates with the respective generator. That is, different models may be implemented within the respective generators to improve on computing object instances for different semantic object classes. Thus, the landscape of models may vary in type and in characteristics as implemented within the generative module 170.

Continuing with the input module 130, once the separate generators are initiated, the input module 130, in one embodiment, electronically receives the requests 180. The requests may be generated through an electronic interface with a user, through an automated internal process for generating training data sets, from a simulator or other electronic source that generates requests to train a particular model, and so on. Whichever source provides the requests 180, the requests 180 include descriptions of custom images that are to be generated. Each of the descriptions is formed according to the template library 160 such that a description indicates at least object classes that is to be included in a custom image and selected characteristics as specified through identifying or actually including templates of the template library 160. In further aspects, the descriptions also include a coarse depiction of the relative locations of the separate object instances in the custom image. In one embodiment, the coarse depiction may take the form of a basic image (e.g., monochromatic blocked image identifying areas for objects).

Furthermore, the input module 130, in one embodiment, includes instructions that control the processor 110 to generate component instructions from the description provided in the request 180. In general, the input module 130 receives the request 180, parses the description to identify various aspects of the custom image that is to be generated, and then proceeds to generate the component instructions. In one embodiment, the component instructions are commands or controls that are provided to the respective generators within the generative module 170. Thus, the input module 130, in one approach, generates separate component instructions for separate ones of the object instances that are to be included within the custom image. Accordingly, separate object classes may have more than a single component instruction when the custom image includes multiple objects instances of the same class.

In either case, the input module 130 generates the component instructions by, in one embodiment, translating the templates or identifiers of the templates included in the description into vectors that locate the characteristics in the latent space of respective generators. In one embodiment, the input module 130 references the template library 160 to identify the vectors. The input module 130 may further form additional instructions that are provided along with the component instruction for separate object instances such as relative position, particular, lighting, weather, and other particular characteristics of the custom image. In this way, the input module 130 forms the component instructions to provide sufficient information to an associated generator such that the separate object instances can be accurately rendered.

With continued reference to FIG. 1, in one embodiment, the translation module 140 generally includes instructions that function to control the processor 110 to compute object instances according to the component instructions. In one embodiment, the translation module 140 employs the generative module 170, and the generators included therein as previously mentioned to generate the object instances according to the component instructions. That is, the translation module 140 provides the separate component instructions to the corresponding generators on respective communication paths within the generative module 170. By providing the component instructions to the generators, the translation module 140 controls the respective generators to create the object instances according to selected characteristics as specified by the original request 180. As an additional note, it should be appreciated that each of the separate generators depicted in the generative module 170 are, in one embodiment, fully differentiable and thus may be executed in parallel to provide for more efficiently producing the separate object instances.

As such, once the translation module 140 controls the generative module 170 to produce the object instances, the translation module 140 further blends the object instances together to form the custom image. In one embodiment, the generative module 170 includes a blending layer 345 that accepts the object instances and blends the object instances into the custom image. While the blending layer is discussed as being a part of the generative module 170, in further embodiments, the blending layer 345 is integrated within the translation module 140 or may be provided in a distributed manner as a cloud-based service. In either case, the blending layer 345, in one embodiment, computes the custom image through applying a weighted summation to the object instances as arranged in the custom image according to the description or according to a determined configuration by the blending layer 345 itself. In further embodiments, the blending layer 345 is itself a separate machine learning model such as a convolutional neural network (CNN) or other model that is trained to produce photorealistic images from a set of object instances.

Accordingly, in one embodiment, the translation module 140 generally controls the blending layer 345 to provide an electronic output 350 that includes a custom image 355 and associated semantic labels 360. The custom image 355 is a photorealistic depiction of a scene (e.g., driving scene) that includes object instances in an arrangement as originally specified in the request 180. The labels 360 provide an identification of the object instances within the custom image 355 such that pixels associated with each of the different object instances labeled according to at least an associated semantic object class. This style of labeling the image results in, for example, generally complete delineations between the object instances such that the custom image 355 is wholly labeled on a pixel-by-pixel basis. Accordingly, the labels 360 distinguish between separate computer-generated object instances that are depicted therein. Moreover, while the custom image 355 and the labels 360 are depicted as separate electronic data structures, in one embodiment, the labels 360 are integrated with the image 355 itself.

Figure 4:
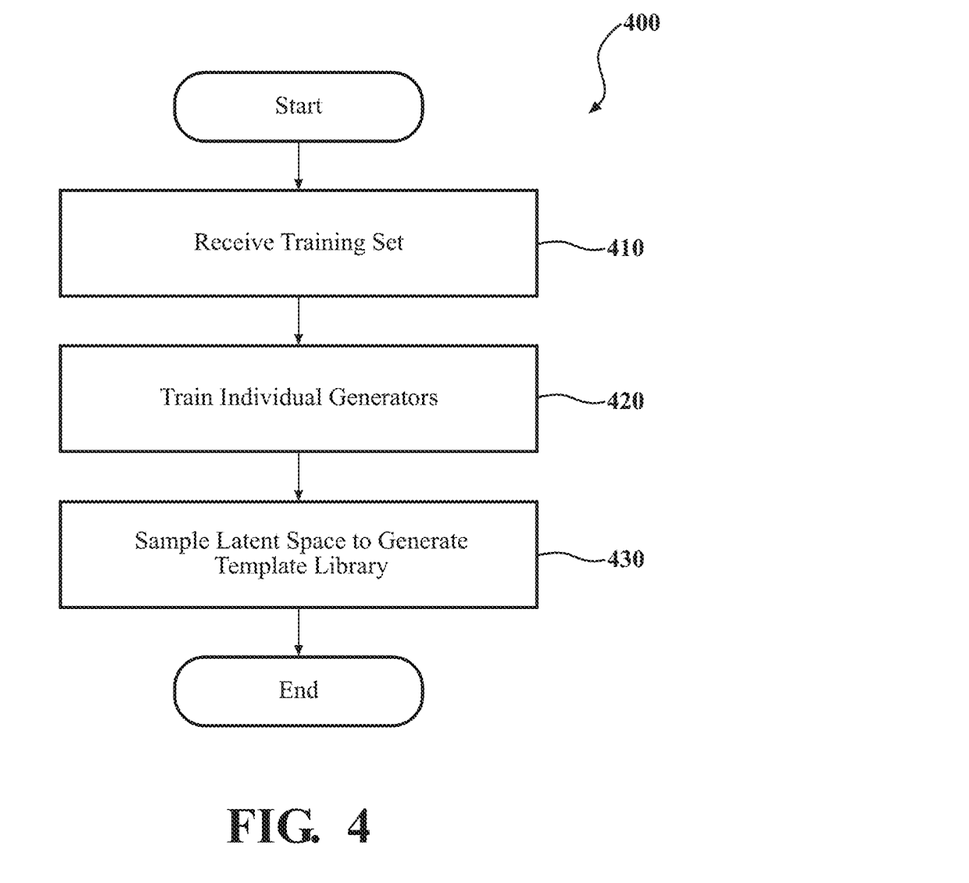
FIG. 4 illustrates one embodiment of a method associated with generating a template library that maps various characteristics of objects to locations within latent spaces of respective generators.
Figure 5:
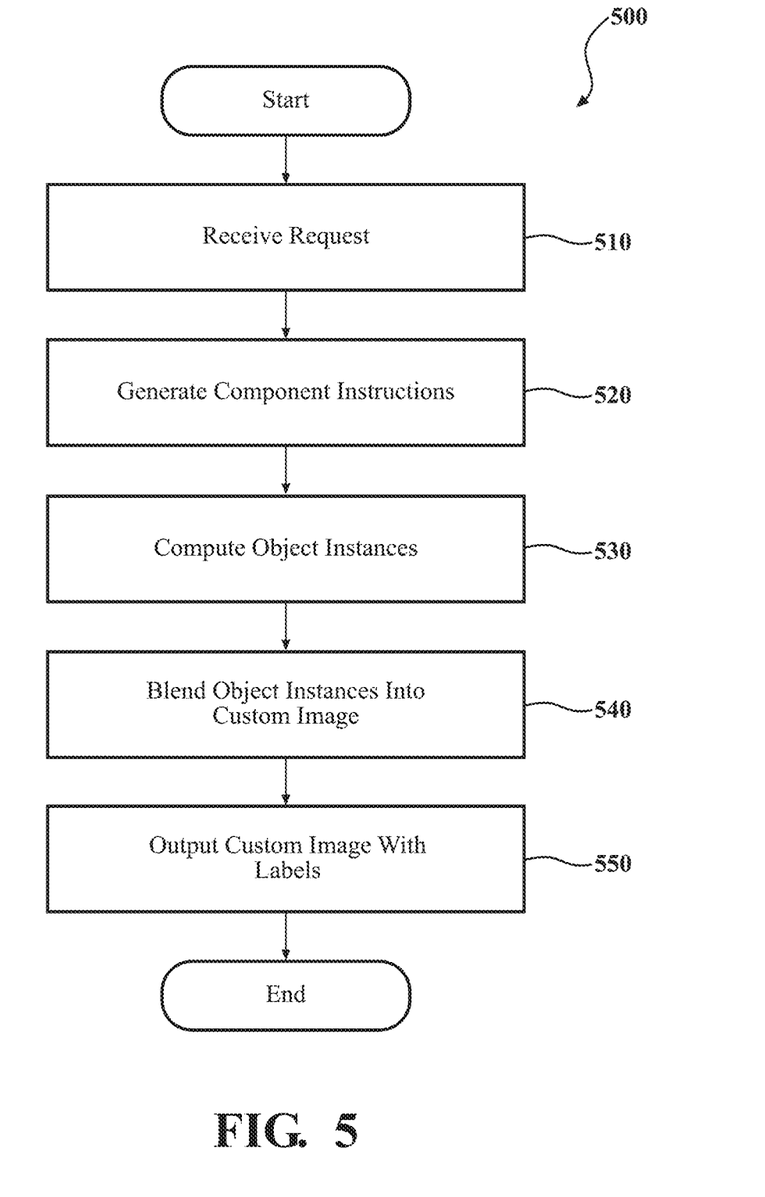
FIG. 5 illustrates one embodiment of a method associated with conditionally generating a custom image through sampling latent space of respective generators.

Additional aspects of generating custom images in a photorealistic format will be discussed in relation to FIGS. 4 and 5. FIG. 4 illustrates a flowchart of a method 400 that is associated with generating a template library of various characteristics encoded by latent spaces within the generative module 170. FIG. 5 illustrates a method 500 associated with generating custom images by using the template library to control characteristics of object instances included in the custom images. Methods 400 and 500 will be discussed from the perspective of the adaptation system 100 of FIG. 1. While methods 400 and 500 are discussed in combination with the adaptation system 100, it should be understood that the methods 400/500 are not limited to being implemented within the adaptation system 100 but is instead one example of a system that may implement the methods 400/500.

At 410, the adaptation system 100 receives a training set of images. In one embodiment, the training set is a set of real images that include labels of object instances depicted within the images. If not initially labeled, the adaptation system 100 may apply an object recognition algorithm to the image set to produce the labels. Moreover, the real images themselves generally depict a scene that is related to an overall focus of the adaptation system 100. Thus, the real images may depict driving scenes if directed to providing data for driving-related activities. In either case, the real images depict a various assortment of object instances for different classes and of different characteristics within each class in order to provide a comprehensive data sampling for training.

At 420, the adaptation system 100 trains at least one generator of the generative module 170 to create object instances of a semantic object class. Thus, the adaptation system 100 trains the respective generator to, for example, populate an associated latent space with an encoded representation of the object instances from the set of real images. Accordingly, the training process for the respective generators is generally executed such that the generators render custom instance of an object class which is then, for example, discriminated according to a further aspect of the generator in order to improve generation over iterations of the training and also the representation with the latent space. As a result of the training process, the generators are individually associated with respective semantic object classes such that subsequent execution of the generator on appropriate inputs results in creation of a photorealistic object instance from the relevant object class. It should be appreciated that as used herein, a photorealistic image refers to an image that is computer-generated yet is generally indistinguishable from a real image acquired by a camera imaging a real-world scene. Accordingly, the object instances and the custom images discussed herein are photorealistic images that approximate real-world objects/scenes and are generally indistinguishable according to at least a discriminator of the generative module 170.

At 430, the adaptation system 100 iteratively samples the latent space of the generator to produce a template library that maps options for varying characteristics of the object instance with vector quantities in the associated latent space. As explained previously in greater detail, the latent space encodes a spectrum of object instances for a particular class and thus forms an understanding of the generator about the object class. The templates are mappings between the latent space and identified characteristics that provide for actively sampling the encodings when executing the generator in order to control how an object instance is generated. Thus, requests to the adaptation system 100 can reference the templates in order to specify characteristics of object instances that are to be included in a custom image.

At 510, the adaptation system 100 receives a request to generate a custom image. In one embodiment, the request is for a single image whereas in further embodiments the request may specify a plurality of custom images of differing configurations. In either case, the request includes a description of at least the custom image. In one approach, the description includes a selection of object classes and characteristics of the object classes to be included within the custom image. The description may also include an arrangement of locations for the selection of object classes within the custom image in the form of a coarse image depicting relative positions and, for example, sizes or other characteristics that may be depicted in the coarse image. In either case, the description provides details of different classes of objects, arrangements of the objects, and characteristics to be included in the custom image.

At 520, the input module 130 generates a component instruction for the object instances identified in the description. In one embodiment, the input module 130 translates the description about requested characteristics for an object instance into a vector. The input module 130, in one embodiment, references the template library 160 to provide the vector which identifies a portion of a latent space within a respective one of the generators that correlates with the requested characteristics. Thus, the translation module 140 can subsequently control execution of the respective generator using the vector and cause the object instance to be produced with desired characteristics. Accordingly, the input module 130, in one embodiment, repeats the process at 520 for each object instance by generating an associated component instruction including an associated vector.

At 530, the translation module 140 computes the object instance of the custom image by controlling the respective one of the generators according to the corresponding component instruction. In one embodiment, the translation module 140 controls the respective generators within the generative module 170 using the component instructions from 530. In general, the translation module 140 controls the respective one of the generators by sampling the latent space according to the vector within component instruction, which specifies a location within the latent space corresponding to requested characteristics. By controlling the separate generators in this way, the translation module 140 conditions the multiple objects instances depicted within the custom image according to known correlations with the latent space. Thus, the translation module 140 can control the generative module 170 to produce the separate object instances in a desired manner and subsequently form a custom image as discussed at 540.

At 540, the translation module 140 generates the custom image. In one embodiment, the translation module 140 generates the custom image by blending the object instances together into a single custom image. As previously mentioned, the blending can take several different forms but generally functions to seamlessly combine the separate object instances together into the custom image as a photorealistic depiction of a requested scene.

At 550, the translation module 140 provides the custom image as an electronic output. In one embodiment, the custom image is stored in a memory (e.g., memory 120, database 150, or another electronic data store). The custom image may be electronically stored until an associated training data set is complete from further rendering by the adaptation system 100 of additional custom images. In either case, the custom image and further custom images produced by the adaptation system 100 are provided according to particular requests for specified characteristics and/or arrangements of object instances and without initially providing a seed image (e.g., synthetic image) from which the custom image is derived. Moreover, the custom image is provided with associated semantic labels that provide, for example, a pixel-by-pixel indication within the custom image of locations for the separate object instances. Of course, in further aspects, the indicated labels and associated locations may be specified in a more generalized manner and, thus, the translation module 140 functions to determine precise locations of the requested object instances within a general framework.

Once the adaptation system 100 produces the custom image and, for example, accumulates a plurality of such images into a training data set, the adaptation system 100 trains a module for which the training data set was generated. Thus, the training data set may be originally generated to include a configuration of scenes that facilitate training an obstacle detection module. In such a case, the training data set may include a distribution of custom images that are directed to a particular task.

Accordingly, the adaptation system 100 loads or otherwise receives the training set that is comprised of the custom images as previously described. In one embodiment, the adaptation system 100 generates the training set and stores the training set until needed. Thus, the adaptation system 100 loads the training set which is comprised of a plurality of custom images. As previously mentioned, the custom images may be initially generated to be directed at depictions of subject matter that relates to a particular task of a module being trained. Thus, the custom images can depict particular selected subject matter that relates to training the module on a specific task (e.g., obstacle detection, collision avoidance, etc.).

Subsequently, the adaptation system 100, in one embodiment, processes the custom images using the module that is being trained. In one embodiment, the module is a machine learning algorithm such as a neural network or similar model that is trained using a set of representative input data that also includes labeled information in order to compare outputs of the model with expected results embodied by the labels and correct the model accordingly. Thus, the adaptation system 100 executes the model on the custom images to generate results.

The adaptation system 100 compares the result with the labels to determine an extent of correlation in the provided result and an expected result. In one embodiment, the correlation is provided as a score whereas in further embodiments the correlation is provided as a binary operator indicating whether the result is correct or not. In either case, the adaptation system 100 assesses the result using the included labels of the custom image.

The adaptation system 100 adjusts the module according to the comparison. That is, in various embodiments, the adaptation system 100 may include a training algorithm or another mechanism that alters internal weighting or other characteristics of the module according to the comparison. In this way, the adaptation system 100 can use the electronically generated custom images to train a module on a particular task thereby achieving improved functioning of the module.

Figure 6:
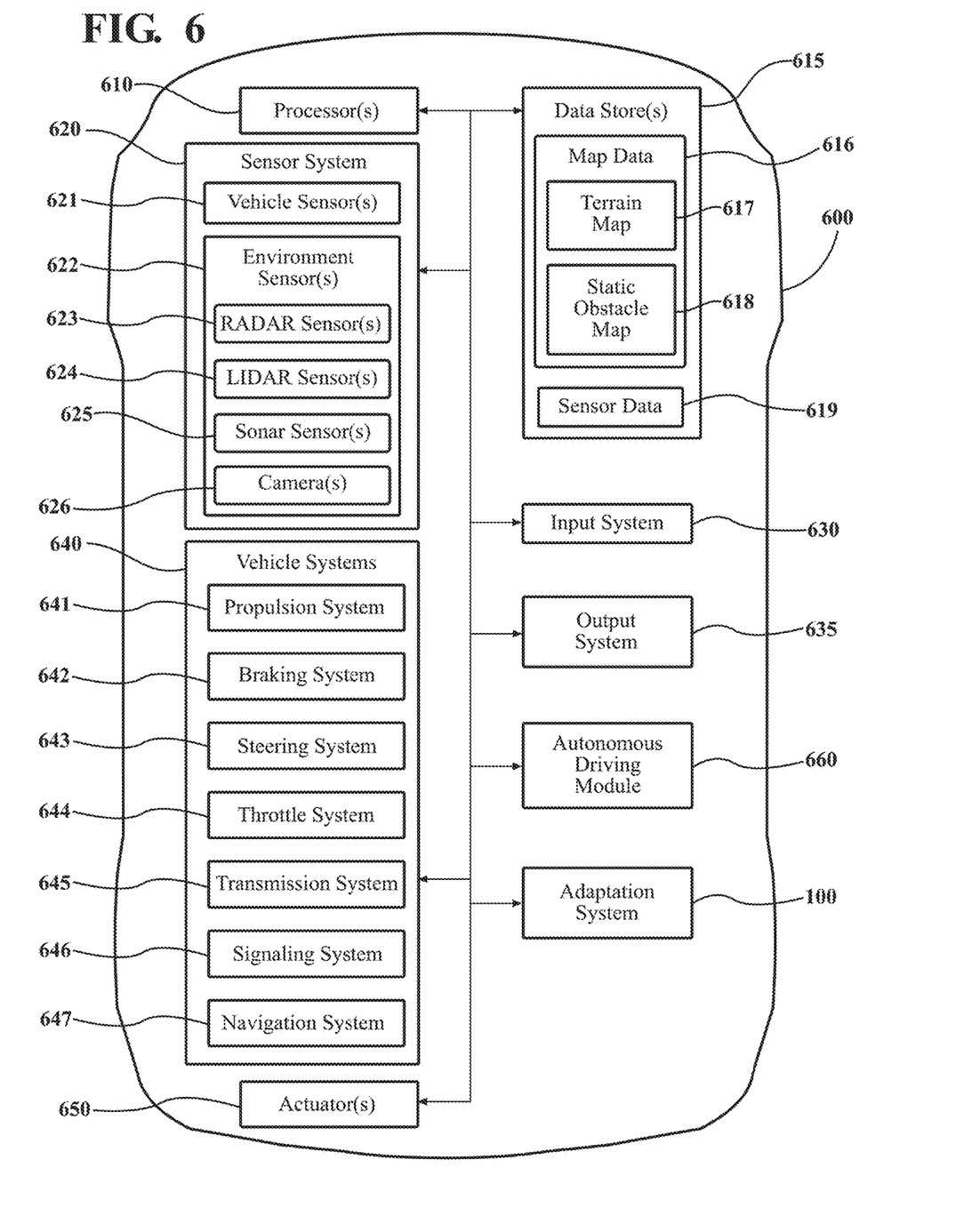
FIG. 6 illustrates one embodiment of a vehicle within which systems and methods disclosed herein may be implemented.

As an additional example of an implementation of at least a portion of the adaptation system 100, an example vehicle 600 will now be discussed in relation to FIG. 6. It should be appreciated that as provided for herein, the adaptation system 100 may be wholly embodied in a remote location from the vehicle 600 and provides trained modules and/or training data sets to the vehicle 100. Moreover, in further aspects, additional aspects of the adaptation system 100 can be integrated with the vehicle 100 itself as discussed. FIG. 6 represents an example environment within which the system and methods disclosed herein may operate. In some instances, the vehicle 600 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 600 can be a conventional vehicle that is configured to operate in only a manual mode.

In one or more embodiments, the vehicle 600 is an autonomous vehicle. As used herein, "autonomous vehicle" refers to a vehicle that operates in an autonomous mode to self-drive without control inputs from a human driver. "Autonomous mode" refers to navigating and/or maneuvering the vehicle 600 along a travel route using one or more computing systems to control the vehicle 600 with minimal or no input from a human driver. In one or more embodiments, the vehicle 600 is highly automated or completely automated. In one embodiment, the vehicle 600 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 600 along a travel route.

The vehicle 600 can include one or more processors 610. In one or more arrangements, the processor(s) 610 can be a main processor of the vehicle 600. For instance, the processor(s) 610 can be an electronic control unit (ECU). The vehicle 600 can include one or more data stores 615 for storing one or more types of data. The data stores 615 can include volatile and/or non-volatile memory. Examples of suitable data stores 615 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 615 can be a component of the processor(s) 610, or the data store 615 can be operatively connected to the processor(s) 610 for use thereby. The term "operatively connected," as used throughout this description, can include direct or indirect connections, including connections without direct physical contact.

In one or more arrangements, the one or more data stores 615 can include map data 616. The map data 616 can include maps of one or more geographic areas. In some instances, the map data 616 can include information or data on roads, traffic control devices, road markings, structures, features, and/or landmarks in the one or more geographic areas. The map data 616 can be in any suitable form. In some instances, the map data 616 can include aerial views of an area. In some instances, the map data 616 can include ground views of an area, including 360-degree ground views. The map data 616 can include measurements, dimensions, distances, and/or information for one or more items included in the map data 616 and/or relative to other items included in the map data 616. The map data 616 can include a digital map with information about road geometry. The map data 616 can be high quality and/or highly detailed.

In one or more arrangements, the map data 616 can include one or more terrain maps 617. The terrain maps 617 can include information about the ground, terrain, roads, surfaces, and/or other features of one or more geographic areas. The terrain maps 617 can include elevation data in the one or more geographic areas. The map data 616 can be high quality and/or highly detailed. The terrain maps 617 can define one or more ground surfaces, which can include paved roads, unpaved roads, land, and other things that define a ground surface.

In one or more arrangements, the map data 616 can include one or more static obstacle maps 618. The static obstacle map(s) 618 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 618 can have location data, size data, dimension data, material data, and/or other data associated with it. The static obstacle map(s) 618 can include measurements, dimensions, distances, and/or information for one or more static obstacles. The static obstacle map(s) 618 can be high quality and/or highly detailed. The static obstacle map(s) 618 can be updated to reflect changes within a mapped area.

The one or more data stores 615 can include sensor data 619. In this context, "sensor data" means any information about the sensors that the vehicle 600 is equipped with, including the capabilities and other information about such sensors. As will be explained below, the vehicle 600 can include the sensor system 620. The sensor data 619 can relate to one or more sensors of the sensor system 620. As an example, in one or more arrangements, the sensor data 619 can include information on one or more LIDAR sensors 624 of the sensor system 620.

In some instances, at least a portion of the map data 616 and/or the sensor data 619 can be located in one or more data stores 615 located onboard the vehicle 600. Alternatively, or in addition, at least a portion of the map data 616 and/or the sensor data 619 can be located in one or more data stores 615 that are located remotely from the vehicle 600.

As noted above, the vehicle 600 can include the sensor system 620. The sensor system 620 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 620 includes a plurality of sensors, the sensors can work independently from each other. Alternatively, two or more of the sensors can work in combination with each other. In such case, the two or more sensors can form a sensor network. The sensor system 620 and/or the one or more sensors can be operatively connected to the processor(s) 610, the data store(s) 615, and/or another element of the vehicle 600 (including any of the elements shown in FIG. 6). The sensor system 620 can acquire data of at least a portion of the external environment of the vehicle 600.

The sensor system 620 can include any suitable type of sensor. Various examples of different types of sensors will be described herein. However, it will be understood that the embodiments are not limited to the particular sensors described. The sensor system 620 can include one or more vehicle sensors 621. The vehicle sensors 621 can detect, determine, and/or sense information about the vehicle 600 itself. In one or more arrangements, the vehicle sensors 621 can be configured to detect, and/or sense position and orientation changes of the vehicle 600, such as, for example, based on inertial acceleration. In one or more arrangements, the vehicle sensors 621 can include one or more accelerometers, one or more gyroscopes, an inertial measurement unit (IMU), a dead-reckoning system, a global navigation satellite system (GNSS), a global positioning system (GPS), a navigation system 647, and/or other suitable sensors. The vehicle sensors 621 can be configured to detect, and/or sense one or more characteristics of the vehicle 600. In one or more arrangements, the vehicle sensors 621 can include a speedometer to determine a current speed of the vehicle 600.

Alternatively, or in addition, the sensor system 620 can include one or more environment sensors 622 configured to acquire, and/or sense driving environment data. "Driving environment data" includes data or information about the external environment in which an autonomous vehicle is located or one or more portions thereof. For example, the one or more environment sensors 622 can be configured to detect, quantify and/or sense obstacles in at least a portion of the external environment of the vehicle 600 and/or information/data about such obstacles. Such obstacles may be stationary objects and/or dynamic objects. The one or more environment sensors 622 can be configured to detect, measure, quantify and/or sense other things in the external environment of the vehicle 600, such as, for example, lane markers, signs, traffic lights, traffic signs, lane lines, crosswalks, curbs proximate the vehicle 600, off-road objects, etc.

Various examples of sensors of the sensor system 620 will be described herein. The example sensors may be part of the one or more environment sensors 622 and/or the one or more vehicle sensors 621. However, it will be understood that the embodiments are not limited to the particular sensors described. As an example, in one or more arrangements, the sensor system 620 can include one or more radar sensors 623, one or more LIDAR sensors 624, one or more sonar sensors 625, and/or one or more cameras 626. In one or more arrangements, the one or more cameras 626 can be high dynamic range (HDR) cameras or infrared (IR) cameras.

The vehicle 600 can include an input system 630. An "input system" includes any device, component, system, element or arrangement or groups thereof that enable information/data to be entered into a machine. The input system 630 can receive an input from a vehicle passenger (e.g., a driver or a passenger). The vehicle 600 can include an output system 635. An "output system" includes any device, component, or arrangement or groups thereof that enable information/data to be presented to a vehicle passenger (e.g., a person, a vehicle passenger, etc.).

The vehicle 600 can include one or more vehicle systems 640. Various examples of the one or more vehicle systems 640 are shown in FIG. 6. However, the vehicle 600 can include more, fewer, or different vehicle systems. It should be appreciated that although particular vehicle systems are separately defined, each or any of the systems or portions thereof may be otherwise combined or segregated via hardware and/or software within the vehicle 600. The vehicle 600 can include a propulsion system 641, a braking system 642, a steering system 643, throttle system 644, a transmission system 645, a signaling system 646, and/or a navigation system 647. Each of these systems can include one or more devices, components, and/or combination thereof, now known or later developed.

The navigation system 647 can include one or more devices, applications, and/or combinations thereof, now known or later developed, configured to determine the geographic location of the vehicle 600 and/or to determine a travel route for the vehicle 600. The navigation system 647 can include one or more mapping applications to determine a travel route for the vehicle 600. The navigation system 647 can include a global positioning system, a local positioning system or a geolocation system.

The processor(s) 610 (and/or processor 110), the adaptation system 100, and/or the autonomous driving module(s) 660 can be operatively connected to communicate with the various vehicle systems 640 and/or individual components thereof. For example, returning to FIG. 6, the processor(s) 610 and/or the autonomous driving module(s) 660 can be in communication to send and/or receive information from the various vehicle systems 640 to control the movement, speed, maneuvering, heading, direction, etc. of the vehicle 600. The processor(s) 110, the adaptation system 100, and/or the autonomous driving module(s) 660 may control some or all of these vehicle systems 640 and, thus, may be partially or fully autonomous.

The processor(s) 110, the adaptation system 100, and/or the autonomous driving module(s) 660 can be operatively connected to communicate with the various vehicle systems 640 and/or individual components thereof. For example, returning to FIG. 6, the processor(s) 610, the adaptation system 100, and/or the autonomous driving module(s) 660 can be in communication to send and/or receive information from the various vehicle systems 640 to control the movement, speed, maneuvering, heading, direction, etc. of the vehicle 600. The processor(s) 110, the adaptation system 100, and/or the autonomous driving module(s) 660 may control some or all of these vehicle systems 640. For example, the processor 610, in one embodiment, controls the camera 626 to acquire images of an area surrounding the vehicle, which are then provided to the adaptation system 100 to extract content about the environment so that the autonomous driving module 660 can make determinations about how to control the vehicle 600.

The processor(s) 610, the adaptation system 100, and/or the autonomous driving module(s) 660 may be operable to control the navigation and/or maneuvering of the vehicle 600 by controlling one or more of the vehicle systems 640 and/or components thereof. For instance, when operating in an autonomous mode, the processor(s) 610, the adaptation system 100, and/or the autonomous driving module(s) 660 can control the direction and/or speed of the vehicle 600. The processor(s) 610, the adaptation system 100, and/or the autonomous driving module(s) 660 can cause the vehicle 600 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 600 can include one or more actuators 650. The actuators 650 can be any element or combination of elements operable to modify, adjust and/or alter one or more of the vehicle systems 640 or components thereof to responsive to receiving signals or other inputs from the processor(s) 610 and/or the autonomous driving module(s) 660. Any suitable actuator can be used. For instance, the one or more actuators 650 can include motors, pneumatic actuators, hydraulic pistons, relays, solenoids, and/or piezoelectric actuators, just to name a few possibilities.

The vehicle 600 can include one or more modules, at least some of which are described herein. The modules can be implemented as computer-readable program code that, when executed by a processor 610, implement one or more of the various processes described herein. One or more of the modules can be a component of the processor(s) 610, or one or more of the modules can be executed on and/or distributed among other processing systems to which the processor(s) 610 is operatively connected. The modules can include instructions (e.g., program logic) executable by one or more processor(s) 610. Alternatively, or in addition, one or more data store 615 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 600 can include one or more autonomous driving modules 660. The autonomous driving module(s) 660 can be configured to receive data from the sensor system 620 and/or any other type of system capable of capturing information relating to the vehicle 600 and/or the external environment of the vehicle 600. In one or more arrangements, the autonomous driving module(s) 660 can use such data to generate one or more driving scene models. The autonomous driving module(s) 660 can determine position and velocity of the vehicle 600. The autonomous driving module(s) 660 can determine the location of obstacles, objects, or other environmental features including traffic signs, trees, shrubs, neighboring vehicles, pedestrians, etc.

The autonomous driving module(s) 660 can be configured to receive, and/or determine location information for obstacles within the external environment of the vehicle 600 for use by the processor(s) 610, and/or one or more of the modules 660 described herein to estimate position and orientation of the vehicle 600, vehicle position in global coordinates based on signals from a plurality of satellites, or any other data and/or signals that could be used to determine the current state of the vehicle 600 or determine the position of the vehicle 600 with respect to its environment for use in either creating a map or determining the position of the vehicle 600 in respect to map data.

The autonomous driving modules 660 either independently or in combination can be configured to determine travel path(s), current autonomous driving maneuvers for the vehicle 600, future autonomous driving maneuvers and/or modifications to current autonomous driving maneuvers based on data acquired by the sensor system 620, driving scene models, and/or data from any other suitable source such as determinations from sensor data. "Driving maneuver" means one or more actions that affect the movement of a vehicle. Examples of driving maneuvers include: accelerating, decelerating, braking, turning, moving in a lateral direction of the vehicle 600, changing travel lanes, merging into a travel lane, and/or reversing, just to name a few possibilities. The autonomous driving module(s) 660 can be configured to implement determined driving maneuvers. The autonomous driving module(s) 660 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 660 can be configured to execute various vehicle functions and/or to transmit data to, receive data from, interact with, and/or control the vehicle 600 or one or more systems thereof (e.g. one or more of vehicle systems 640).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An adaptation system for generating a custom image using a generative module that includes a plurality of generators, comprising:
   one or more processors;
   a memory communicably coupled to the one or more processors and storing:
   an input module including instructions that when executed by the one or more processors cause the one or more processors to, in response to receiving a request to generate the custom image, generate a component instruction by translating a description about requested characteristics for an object instance into a vector that identifies a portion of a latent space that correlates with the requested characteristics, the latent space being within a respective one of the generators; and
   a translation module including instructions that when executed by the one or more processors cause the one or more processors to compute the object instance of the custom image by controlling the respective one of the generators according to the component instruction to produce the object instance, the respective one of the generators being configured to generate objects within a semantic object class of the object instance,
   wherein the translation module includes instructions to generate the custom image from at least the object instance to produce the custom image from the description as a photorealistic image approximating a real image corresponding to the description.

2. The adaptation system of claim 1, wherein the translation module includes instructions to generate the component instruction including instructions to select the vector for the requested characteristics according to mappings within a template of a template library that is identified in the description,
   wherein the template library maps characteristics of different semantic object classes to vectors associated with latent spaces of the generators, and wherein the generators include respective ones of the latent spaces that are encoded representations of a plurality of different object instances with different characteristics within an object class.

3. The adaptation system of claim 1, wherein the generators are variational autoencoder generative adversarial networks (VAE-GANs) that are each associated with a different semantic object class, and wherein the description includes i) a selection of object classes and characteristics of the object classes to be included within the custom image and ii) an arrangement of locations for the selection of object classes within the custom image.

4. The adaptation system of claim 1, wherein the translation module includes instructions to compute the object instance including instructions to control the respective one of the generators to sample encoded characteristics from the latent space according to the vector and generate the object instance from the encoded characteristics.

5. The adaptation system of claim 1, wherein the translation module includes instructions to generate the custom image including instructions to blend, using a blending layer in the generative module, the object instance with subsequent object instances identified by the description together to produce a custom image, and wherein the translation module includes instructions to blend including instructions to combine the object instance and the subsequent object instances into the custom image and process the custom image to seamless integrate the object instance and the subsequent object instances together.

6. The adaptation system of claim 1, wherein the description includes selections of multiple object instances and associated selected characteristics to include within the custom image, wherein generating the component instruction includes generating an associated component instruction for each of the multiple object instances including an associated vector, and
wherein the generators are individually associated with respective semantic object classes by separately training the generators to generate object instances of the respective semantic object classes.

7. The adaptation system of claim 6, wherein the translation module includes instructions to generate the object instance including instructions to execute a subset of the generators that correspond with respective semantic object classes of the multiple object instances to individually generate the multiple object instances; and
wherein the translation module includes instructions to generate the custom image including instructions to conditionally generate the multiple objects instances depicted within the custom image according to the selected characteristics as represented through sampling latent spaces of respective ones of the generators.

8. The adaptation system of claim 1, wherein the translation module includes instructions to:
train, using a set of real images depicting objects of a selected semantic object class, a selected one of the generators to populate an associated latent space of the selected one of the generators with an encoded representation of the objects from the set of real images,
wherein the selected one of the generators is trained to generate a custom instance of an object within the selected semantic object class in a photorealistic form; and
iteratively sample the associated latent space to produce a library of templates that map options for varying characteristics of the custom instance with vector quantities in the associated latent space.

9. A non-transitory computer-readable medium for generating a custom image using a generative module that includes a plurality of generators and including instructions that when executed by one or more processors cause the one or more processors to:
in response to receiving a request to generate the custom image, generate a component instruction by translating a description about requested characteristics for an object instance into a vector that identifies a portion of a latent space that correlates with the requested characteristics, the latent space being within a respective one of the generators;
compute the object instance of the custom image by controlling the respective one of the generators according to the component instruction to produce the object instance, the respective one of the generators being configured to generate objects within a semantic object class of the object instance; and
generate the custom image from at least the object instance to produce the custom image from the description as a photorealistic image approximating a real image corresponding to the description.

10. The non-transitory computer-readable medium of claim 9, wherein the instructions to generate the component instruction include instructions to select the vector for the requested characteristics according to mappings within a template of a template library that is identified in the description,
wherein the template library maps characteristics of different semantic object classes to vectors associated with latent spaces of the generators, and wherein the generators include respective ones of the latent spaces that are encoded representations of a plurality of different object instances with different characteristics within an object class.

11. The non-transitory computer-readable medium of claim 9, wherein the generators are variational autoencoder generative adversarial networks (VAE-GANs) that are each associated with a different semantic object class, and
wherein the description includes i) a selection of object classes and characteristics of the object classes to be included within the custom image and ii) an arrangement of locations for the selection of object classes within the custom image.

12. The non-transitory computer-readable medium of claim 9, wherein the instructions to compute the object instance include instructions to control the respective one of the generators to sample encoded characteristics from the latent space according to the vector and generate the object instance from the encoded characteristics.

13. The non-transitory computer-readable medium of claim 9, wherein the instructions to generate the custom image include instructions to blend, using a blending layer in the generative module, the object instance with subsequent object instances identified by the description together to produce a custom image, and
wherein the instructions to blend include instructions to combine the object instance and the subsequent object instances into the custom image and process the custom image to seamless integrate the object instance and the subsequent object instances together.

14. A method of generating a custom image using a generative module that includes a plurality of generators, comprising:
in response to receiving a request to generate the custom image, generating a component instruction by translating a description about requested characteristics for an object instance into a vector that identifies a portion of a latent space that correlates with the requested characteristics, the latent space being within a respective one of the generators;

computing the object instance of the custom image by controlling the respective one of the generators according to the component instruction to produce the object instance, the respective one of the generators being configured to generate objects within a semantic object class of the object instance; and generating the custom image from at least the object instance to produce the custom image from the description as a photorealistic image approximating a real image corresponding to the description.

15. The method of claim 14, wherein generating the component instruction selects the vector for the requested characteristics according to mappings within a template of a template library that is identified in the description, wherein the template library maps characteristics of different semantic object classes to vectors associated with latent spaces of the generators, and wherein the generators include respective ones of the latent spaces that are encoded representations of a plurality of different object instances with different characteristics within an object class.

16. The method of claim 14, wherein the generators are variational autoencoder generative adversarial networks (VAE-GANs) that are each associated with a different semantic object class, and wherein the description includes i) a selection of object classes and characteristics of the object classes to be included within the custom image and ii) an arrangement of locations for the selection of object classes within the custom image.

17. The method of claim 14, wherein computing the object instance includes controlling the respective one of the generators to sample encoded characteristics from the latent space according to the vector and generate the object instance from the encoded characteristics.

18. The method of claim 14, wherein generating the custom image includes blending, using a blending layer in the generative module, the object instance with subsequent object instances identified by the description together to produce a custom image, wherein blending includes combining the object instance and the subsequent object instances into the custom image and processing the custom image to seamless integrate the object instance and the subsequent object instances together.

19. The method of claim 14, wherein the description includes selections of multiple object instances and associated selected characteristics to include within the custom image, wherein generating the component instruction includes generating an associated component instruction for each of the multiple object instances including an associated vector, wherein the generators are individually associated with respective semantic object classes by separately training the generators to generate object instances of the respective semantic object classes, wherein generating the object instance includes executing a subset of the generators that correspond with respective semantic object classes of the multiple object instances to individually generate the multiple object instances; and wherein generating the custom image includes conditioning the multiple objects instances depicted within the custom image according to the selected characteristics as represented through sampling the latent spaces of respective ones of the generators.

20. The method of claim 14, further comprising:

training, using a set of real images depicting objects of a selected semantic object class, a selected one of the generators to populate an associated latent space of the selected one of the generators with an encoded representation of the objects from the set of real images, wherein the selected one of the generators is trained to generate a custom instance of an object within the selected semantic object class in a photorealistic form; and iteratively sampling the associated latent space to produce a library of templates that map options for varying characteristics of the custom instance with vector quantities in the associated latent space.

* * * * *